June 20, 1961     A. C. LORENZ     2,989,171
ROTARY PLOW FEEDER
Filed Aug. 21, 1958     3 Sheets-Sheet 3
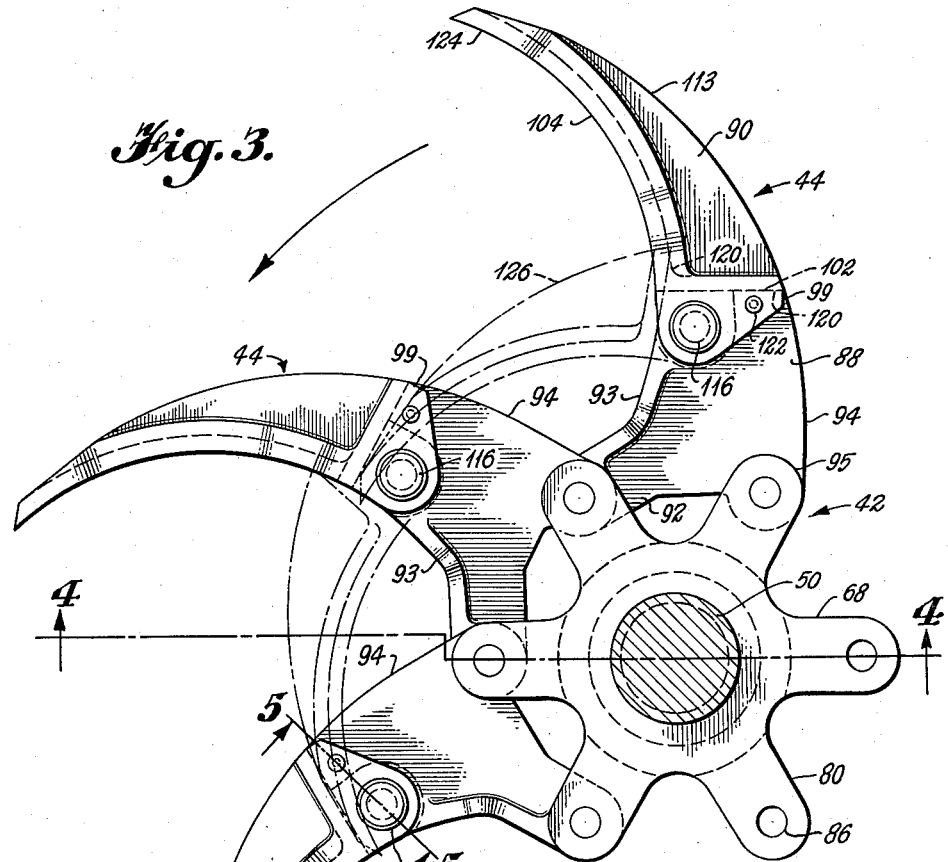
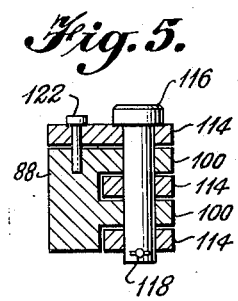
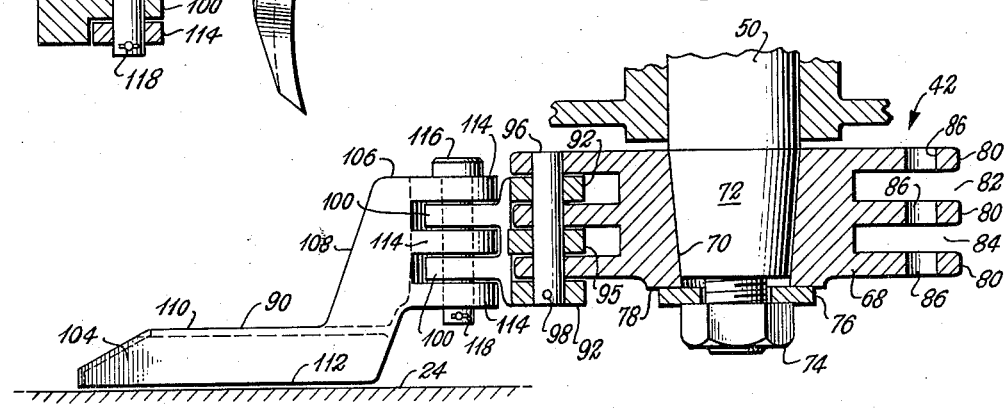

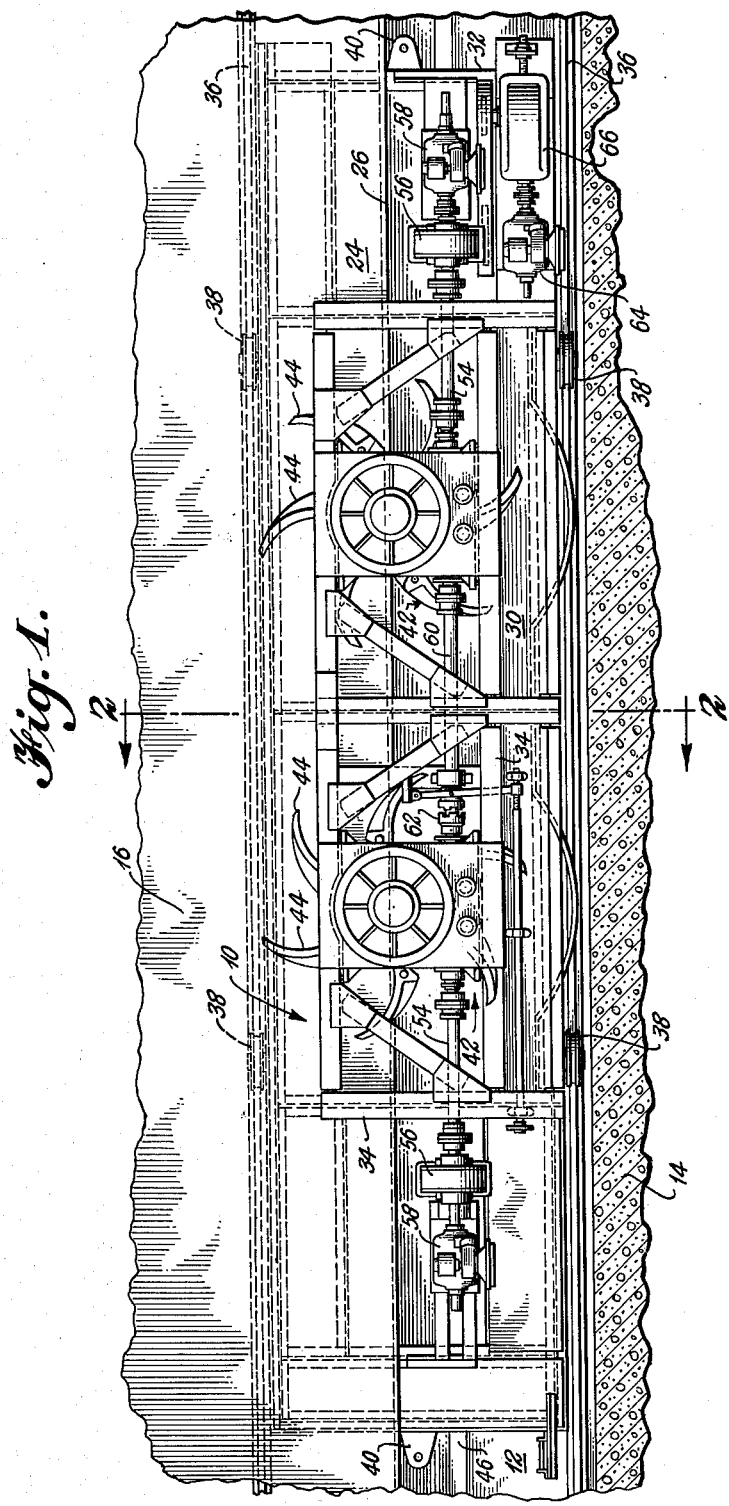

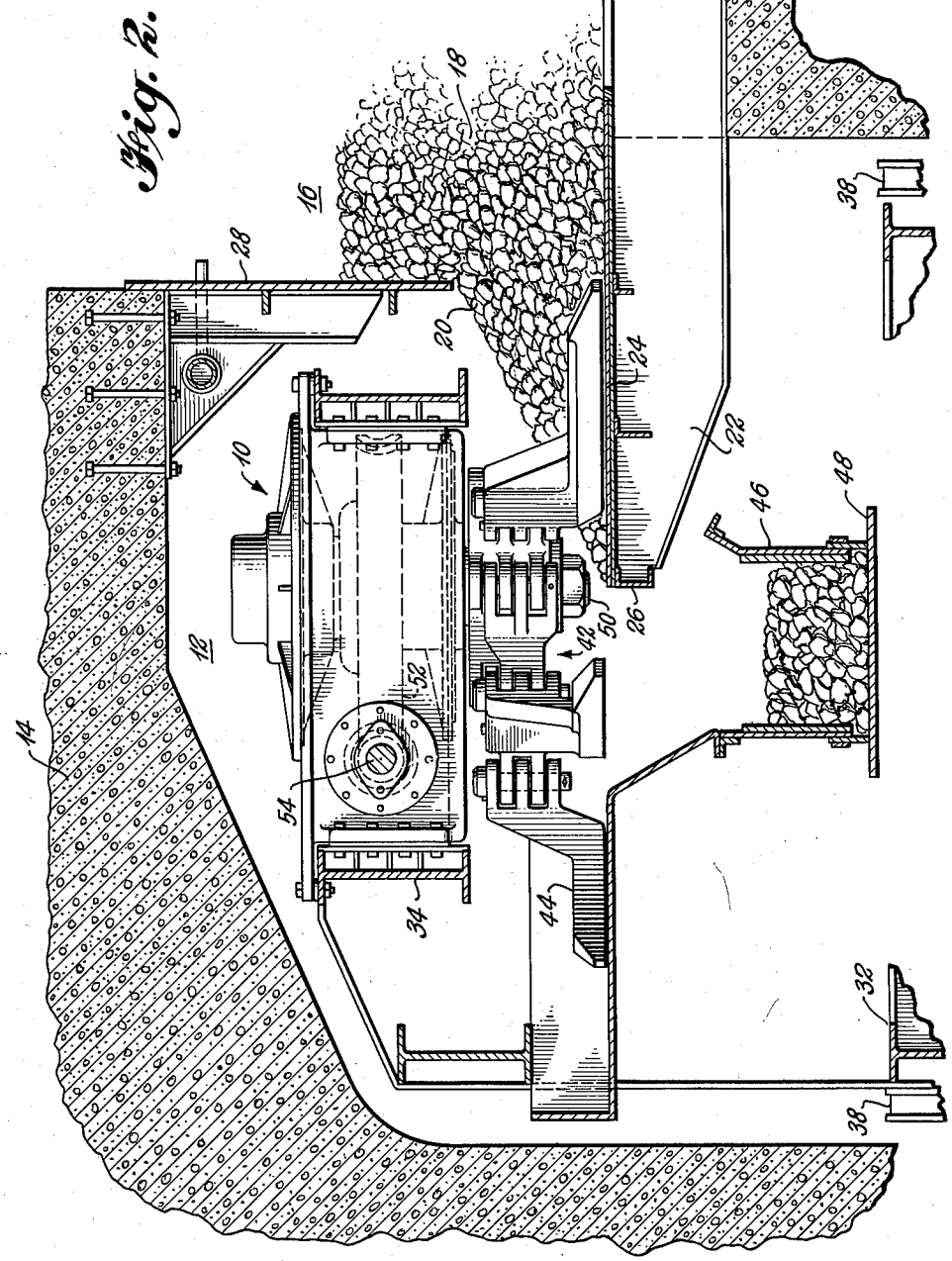

United States Patent Office
2,989,171
Patented June 20, 1961

2,989,171
ROTARY PLOW FEEDER
Arthur C. Lorenz, Hatfield, Pa., assignor to Link-Belt Company, a corporation of Illinois
Filed Aug. 21, 1958, Ser. No. 756,347
7 Claims. (Cl. 198—212)

This invention relates to feeders for transferring loose bulk material from storage to a conveyor or other transporting equipment.

Rotary plow feeders, with which this invention is concerned, are primarily intended for use in operations requiring high capacity reclamation of stockpiled bulk materials. For example, when it is necessary to stockpile mineral ore close to a dock, or a railroad terminal, while awaiting a transport vessel or train, a rotary plow feeder may be advantageously employed to effect rapid recovery of the ore from the bottom of the stockpile for loading the transport means when it becomes available.

In use, the rotary plow feeder is located in a tunnel which extends underneath the stockpile which may be either in an unconfined pile or in a suitable storage bin. Along one side of the tunnel is formed a shelf to which the material is fed by gravity through an elongated opening or slot formed in the side of and extending throughout the entire length of the tunnel and shelf. The size of the opening and the width of the shelf, however are so related to the angle of repose of the material that the latter does not flow by gravity over the edge of the shelf into the bottom portion of the tunnel, but instead comes to rest on the shelf and controls the further flow of material.

The feeder itself includes a carriage mounted for movement along the length of the tunnel floor and, attached to the carriage, is at least one plow element having a plurality of generally radial blade assemblies. The plow element rotates about a vertical axis fixed with respect to the carriage, and is so located that the blade assemblies of the plow travel in a circular path above the top surface of and relatively close to the shelf. Upon rotation of the plow element, the blade assemblies engage material on the shelf and convey it over the edge thereof, allowing it to fall freely onto a belt conveyor, or the like, for movement from the tunnel to the loading location for the vessel or train.

Previously, however, one problem attendant the use of rotary plow feeders for stockpiles has been the difficulty of moving the feeder from one location to another along the tunnel length without displacing any of the material from that portion of the shelf past which the plow travels. This type of operation may be highly desirable at times to either reduce the total amount of material delivered to the transport device or to avoid the feeding of material from a certain portion of the stockpile.

The primary object of this invention is to provide a rotary plow feeder which is so constructed that it may be adjusted to be moved in either direction along its path of operation without effecting the feeding of any material from the source of supply.

A more detailed object of this invention is to provide a multiple blade assembly rotary plow feeder which is so constructed that a portion of one or more of the blade assemblies are movable to retracted positions to allow the feeder to travel along its path of operation without such blade portions being operable to displace material.

Another object of this invention is to provide a rotary plow element for a feeder of the above type which has radial blade assemblies connected to a hub portion by means of hinge structures, whereby portions of the blade assemblies may be extended to operative positions for conveying material upon rotation of the plow element, or retracted to inoperative positions in which the feeder may be moved along its path of operation without removing material from the shelf with which the feeder cooperates.

A further object of this invention is to provide a rotary plow element of the foregoing type having locking means for releasably securing portions of the blade assemblies in their normal operative positions.

Other objects and advantages of the invention will be apparent during the course of the following description.

In the accompanying drawings forming a part of this specification and in which like numerals are employed to designate like parts throughout the same, FIGURE 1 is a top plan view of a rotary plow feeder embodying this invention, FIGURE 2 is a vertical sectional view taken on line 2—2 of FIG. 1, FIGURE 3 is a top plan view of a partially assembled rotary plow element embodying this invention, FIGURE 4 is a vertical sectional view taken on line 4—4 of FIG. 3, and FIGURE 5 is a vertical sectional view taken on line 5—5 of FIG. 3.

In the drawings, wherein for the purpose of illustration is shown a preferred embodiment of this invention, and first particularly referring to FIGS. 1 and 2, there is shown a rotary plow feeder 10 located within a relatively long tunnel 12 of concrete construction 14 having an open side which communicates with the space 16 that underlies the stockpile of loose bulk material 18 which is to be handled by the feeder. Although only a small portion of the material 18 is illustrated, it is to be understood that under normal conditions of storage the space 16 is completely filled, and that the concrete construction 14 may be entirely covered with the material.

The interior of the tunnel 12 communicates with the space 16 through an elongated opening 20 formed in the side of the tunnel and extending the entire length thereof. A rigid shelf 22 connected to the concrete construction 14 defines the bottom of the opening 20 and the bottom of the space 16. This shelf 22 has a flat horizontal top surface 24 which extends longitudinally of the tunnel for the full length thereof, and transversely to an inner edge 26 located in the interior of the tunnel some distance from the opening 20. The shelf 22, as seen best in FIG. 2, serves to support a quantity of material 18 which assumes a natural shape as determined by its angle of repose and prevents an excessive flow of material to the shelf by closing off or choking the opening. Preferably, the size of the opening 20 is adjustable by means such as a vertically movable gate 28, and so regulated with respect to the angle of repose of the material 18 that the material on the shelf forms an unconfined accumulation extending very nearly to the inner edge 26 of the shelf.

The purpose of the feeder 10 is to remove material 18 from the top surface 24 of the shelf at a controlled rate to a conveyor or other equipment which subsequently carries the material from the tunnel to the location for loading onto a vessel or train. Referring to FIG. 1, it will be noted that the feeder 10 includes a carriage 30 having a generally rectangular bottom frame portion 32 and a somewhat smaller generally rectangular upper frame portion 34 mounted above the bottom frame portion, both of which frame portions may be constructed as weldments of suitable structural shapes. The carriage 30 is mounted for movement inside and along the length of the tunnel 12 by means of two rails 36 located on opposite sides of the tunnel and two pairs of wheels 38 carried by the lower frame portion 32 and riding on the rails 36. At each end of the carriage 30 is an apertured coupling lug 40 to which a locomotive unit may be attached to move the feeder in opposite directions along the tunnel.

The carriage 30 supports two rotary plow elements 42 each having a plurality of generally radially extending blade assemblies 44 which rotate about a vertical axis in closely spaced relationship with the top surface 24 of the shelf 22, as best seen in FIG. 2. The structure of the rotary plow elements 42 is explained in detail below, however, for the present it will be noted that the blade assemblies 44, upon rotation of the plow element, engage material disposed on the shelf 22 and move it over the inner edge 26 of the shelf from which it falls freely through the top of a trough 46 to the upper run of a belt conveyor 48. Preferably, the belt conveyor 48 is of relatively short length and is carried on the feeder carriage by impact absorbing idler rolls, not shown. From this short conveyor 48, the material, for transport from the tunnel, may be transferred onto a relatively wide belt conveyor, not shown, running the entire length of the tunnel at a level below the feeder carriage.

Suitable drive means are carried by the carriage 30 for effecting rotation of the plow elements 42. As shown in FIGS. 2 and 4, each plow element is connected to the output shaft 50 of a worm gear drive 52 which in turn is connected by means of a shaft 54 and gear reducer 56 to a drive motor 58, all of which are mounted on the carriage. The two worm gear drives 52 may be connected together by means of a shaft 60 and a jaw clutch 62. By engaging the clutch 62, both of the plow elements may be driven from one of the motors 58, or by disengaging the clutch each plow element may be driven independently of the other by its motor 58. A suitable drive motor 64 and gear reducer 66 are also mounted on the feeder carriage 30 for driving the belt conveyor 48 which forms a part of the feeder.

When the two rotary plow elements 42 are used, as in the presently illustrated feeder, it is preferable that they be driven in opposite directions so that the blade assemblies 44 of each plow element as they move over the shelf 24 travel in a direction toward the opposite plow element. The material removed by each of the two plow elements will therefore be united with that removed by the other plow element to form a substantially single stream flowing over the edge 26 of the shelf. Furthermore, the reaction force exerted by one plow element on the feeder carriage during operation will be substantially balanced by an oppositely directed reaction force exerted on the carriage by the other plow element, thus eliminating the tendency of the carriage to travel along the tunnel as would be the case if both plow elements were rotated in the same direction or if only one plow element were employed.

Referring now to FIGS. 3, 4 and 5 for a detailed description of one of the rotary plow elements 42 employed in the feeder 10, it will be noted that the plow element includes a hub portion 68, symmetrical about a central axis, having a tapered bore 70 formed axially therethrough for receiving a correspondingly tapered end portion 72 of the output shaft 50 of the worm gear drive 52. In use, the hub portion 68 may be secured to the end portion 72 of the shaft 50 by suitable means such as a nut 74 threadably engaging the end portion 72, and a washer 76 positioned between the nut 74 and a land 78 formed on the lower part of the hub portion 68 around the bore 70.

Around the periphery of the hub portion 68, at regularly spaced locations, there are a plurality of axially aligned rows of mounting fingers 80. In the present instance each of these axially aligned rows contains three mounting fingers 80 axially spaced relative to one another to provide, as viewed in FIG. 4, an upper recess 82 between the upper and middle fingers and a lower recess 84 between the middle and lower fingers. An opening 86 is formed through each of the mounting fingers 80 along a line substantially parallel to the axis of the hub portion 68.

The blade assemblies 44 are attached to the hub portion 68 and normally extend generally radially outwardly therefrom and curve forwardly toward the direction of rotation, indicated by the arrow of FIG. 3, to provide for proper conveying engagement with the material.

In accordance with the invention the blade assemblies 44 are retractable from their normal extended positions to positions permitting travel of the feeder along the length of the tunnel without the removal of material from the shelf 22. As seen best in FIG. 3, the retractable feature of the plow blade assemblies 44 is obtained by forming each of the same with a fixed radial inner shank 88 attached to the hub 68, and a radially outer blade 90 movably mounted on the inner shank 88, as by means hereinafter described.

For attachment to the hub 68, each of the inner shanks 88 has two spaced apart mounting lugs 92 located at its radially inner end near its leading side 93. One of the mounting lugs 92 fits within the upper recess 82 of one of the rows of mounting fingers 80, and the other underlies, in closely spaced relationship therewith, the bottom finger 80 of the same row. Adjacent the trailing side 94 of each inner shank 88, its inner end is provided with a mounting lug 95 which fits within the lower recess 84 of the next row of fingers 80. In other words, as will be understood from FIG. 3, when the plow element is fully assembled each of the rows of mounting fingers 80 of the hub will have associated therewith two leading mounting lugs 92 of one inner shank 88 and one trailing mounting lug 94 from the next preceding inner shank. Each group of mounting fingers 80 and mounting lugs 92 and 95 are joined together by means of a pin 96 passing through the openings 86 in the fingers 80 and corresponding openings formed in the mounting lugs. A cotter pin 98 passed through the pin 96 and the bottom lug 92 may be used to hold the pin 96 in place.

The inner shank 88 extends radially outwardly from the hub 68 for some distance and terminates at an outer end 99 having two mounting tongues 100 located toward the leading side 93 thereof and axially spaced with respect to the axis of the hub 68. Behind the mounting lugs 100, toward the trailing side 94 of the inner shank 88, the outer end 99 of the latter defines a flat abutment surface 102 which lies in a plane generally parallel to the axis of the hub 68 and serves a purpose hereinafter described.

Each of the outer blades 90 is movably mounted on the outer end 99 of a respective inner shank 88, and when viewed from the top while in its normal operating position, as indicated by the solid lines of FIG. 3, extends generally radially outwardly with respect to the hub 68 and curves forwardly toward the direction of rotation so that the leading surface 104 thereof, which engages the material and is of substantial width, has a negative curvature. This curvature of the leading surface improves the conveying action of the blade by tending to guide material toward the hub portion upon rotation of the plow element.

Viewed from the side, as in FIG. 4, it will be noted that the outer blade 90 includes an inner and upper portion 106 attached to the inner shank 88, a middle portion 108 extending downwardly from the upper portion 106, and an outer and lower portion 110 which defines the curved leading surface 104 and which has a straight bottom edge 112 adapted to travel in closely spaced relationship with the upper surface 24 of the shelf 22. Adjacent its trailing side the lower portion 110 of the outer blade 90 defines a positively curved trailing surface 113 which serves a purpose hereinafter described.

The outer blade 90 is attached to the inner shank 88, as illustrated in FIG. 4, by means of three mounting tongues 114 spaced axially of the axis of the hub 68 and adapted to interfit with the mounting tongues 100 of the inner shank 88. A pin 116 passes through registering openings in the mounting tongues 100 and 114 and provides a hinge connection permitting swinging movement of the outer blade relative to the inner shank about the axis of the pin 116, which axis is substantially parallel to the axis of the hub 68. The hinge pin 116 is maintained in place by a cotter pin 118 inserted through its lower end.

Rearwardly of the mounting tongues 114, toward the trailing side of the outer blade 90, is provided an abutment surface 120 which engages the abutment surface 102 on the inner shank 88 to limit the relative swinging movement of the outer blade 90, in a direction opposite that corresponding to normal rotation of the plow element, to the normal operating position as shown by the solid lines of FIG. 3.

To hold the outer blade 90 in its normal operating position, as seen best in FIG. 3 and 5, the upper mounting tongue 114 of the outerb lade 90 is extended rearwardly and overlaps a part of the inner shank when the former is in its normal operating position. The two overlapped parts are then connected by a removable locking pin 122 inserted through openings in the parts which register when the outer blade is in its operating position.

Referring to FIG. 3, it will be observed that when the locking pin 122 is removed, the hinge connection provided by the pin 116 permits movement of the outer blade 90 from its normal operating position to a retracted position, shown by the dashed lines, reached by swinging the outer blade 90 forwardly toward the immediately preceding blade. The degree of movement afforded is preferably such that the tip 124 of the outer blade 90 can be brought into a position underlying the outer end 99 of the immediately preceding inner shank 88. With all of the outer blades 90 in their retracted positions. The maximum radial extent of the plow element is, therefore, substantially equal to the maximum radial extent of the inner shanks 88, thereby decreasing the effective diameter of the plow element.

It will also be noted that with the outer blades 90 in their retracted positions the positively curved trailing surfaces 113 thereof are presented to the material on the shelf when the plow element is held stationary and the feeder is moved longitudinally of the shelf 22, and that these surfaces will guide the material away from the outer edge 26 of the shelf irrespective of the direction of such longitudinal movement. In other words, with the outer blades in their retracted positions the feeder 10 may be moved from one location to another along the tunnel 12 without removing an appreciable amount of material from the shelf. Furthermore, it will be noted that the pressure exerted by the material against the retracted outer blades 90 as the carriage is moved longitudinally of the shelf will tend to hold the blades in their retracted positions so that no additional holding means are required.

It is to be understood that the form of this invention herewith shown and described is to be taken as a preferred example of the same, and that various changes in the shape, size, and arrangement of the parts may be resorted to without departing from the spirit of the invention or the scope of the subjoined claims.

Having thus described the invention, I claim:

1. A plow element for a rotary plow feeder, comprising a hub adapted for rotation in a given direction about a vertical axis, and a plurality of blade assemblies connected to said hub in circumferentially spaced relation about said axis, each of said blade assemblies including an inner shank rigidly secured to said hub, an arcuately curved outer blade, and means mounting said outer blade on said inner shank for movement between an operative position at which said outer blade extends generally radially outwardly from said inner shank and curves forwardly with respect to the direction of hub rotation and an inoperative position at which said outer blade is folded forwardly from said operative position and extends circumferentially around said hub.

2. A rotary plow element as defined in claim 1 further characterized by said means for mounting said outer blade on said inner shank comprising spaced apart mounting tongues on the outer end of said shank, a mounting portion on the inner end of said outer blade which fits between said mounting tongues, a pivot pin passing through said spaced apart mounting tongues and said mounting portion, abutment surfaces on said inner shank and outer blade, respectively, which coengage and limit the rearward movement of said outer blade to said operative position, and a removable second pin which passes through said outer blade and said inner shank parallel to said pivot pin to lock the outer blade in said operative position.

3. In a feeder for conveying material from the top of an elongated shelf and over one edge thereof, a rotary plow element comprising a rotatable hub, a plurality of blades connected to the hub, each of which normally extends generally radially outwardly with respect to the hub and curves forwardly in the direction of hub rotation to define a negatively curved leading surface for engaging said material upon rotation of the hub and a positively curved trailing surface, and means enabling forward pivotal movement of said blades from their normal radially extending positions to positions wherein the positively curved trailing surfaces thereof are presented to the material upon movement of the plow element in either direction longitudinally of the shelf.

4. A rotary plow feeder for moving material over the top of a stationary elongated shelf for free fall from a longitudinal edge of the latter, comprising a drive unit supported above said shelf for traversing the length thereof in opposite directions and having a depending vertical driven shaft, a hub fixed on the lower end of said shaft, a plurality of blade assemblies, each including an inner shank and an outer blade pivotally connected thereto, and means including the shanks for connecting the outer blades to the hub for movement of the outer blades between radially extended positions wherein the blades, upon traverse of the drive unit in either direction and rotation of the shaft, pass over a portion of the shelf to move the material toward and over the edge of the shelf, and pivotally retracted positions wherein the outer ends of said blades are swung toward said hub so that said blades, upon traversing of the drive unit in either direction, pass over a lesser portion of the shelf and move the material away from the edge of the latter.

5. A rotary plow feeder as defined in claim 4 further characterized by the means connecting the outer blades to the hub including means for locking the blades in their extended positions.

6. A plow element for a rotary plow feeder, comprising a rotatable hub having a plurality of circumferentially spaced mounting fingers, a plurality of blade assemblies equal in number to the spaced hub mounting fingers and each including an inner shank and an outer blade, means including the inner shank of each of said outer blades for attaching each outer blade to two of said spaced hub mounting fingers with the blades normally extending generally radially from the hub, and means enabling independent pivotal movement of each outer blade on its associated shank about an axis that is parallel to the axis of said hub from said normal position to a retracted position extending in a generally circular direction around said hub.

7. A plow element for a rotary plow feeder, comprising a hub having a plurality of circumferentially spaced rows of mounting fingers, a plurality of blade assemblies equal in number to the spaced rows of mounting fingers, each of said blade assemblies including an inner shank and an outer blade, each of said inner shanks having mounting lugs formed on the leading and trailing sides of their inner end for connection to two adjacent spaced rows of mounting fingers on the hub and mounting tongues formed on its outer end, each of said outer blades having mounting tongues formed on its inner end, a pin for pivotally connecting the mounting tongues of each outer blade to the mounting tongues of its respective shank to enable independent movement of each outer blade from a radially extended position to a retracted position extending around the hub, and means for locking the outer blades in their extended positions.

References Cited in the file of this patent

UNITED STATES PATENTS

| | | |
|---|---|---|
| 1,227,090 | Tanczer | May 22, 1917 |
| 2,696,288 | Ball | Dec. 7, 1954 |
| 2,892,552 | Van Zijp | June 30, 1959 |

FOREIGN PATENTS

| | | |
|---|---|---|
| 476,851 | Germany | May 29, 1929 |